(12) United States Patent
Raasthøj et al.

(10) Patent No.: US 11,566,719 B2
(45) Date of Patent: Jan. 31, 2023

(54) ACTUATOR OF A REFRIGERANT VALVE, VALVE ARRANGEMENT COMPRISING A REFRIGERANT VALVE AND AN ACTUATOR AND METHOD FOR MOUNTING AN ACTUATOR OF A REFRIGERANT VALVE TO THE REFRIGERANT VALVE

(71) Applicant: Danfoss A/S, Nordborg (DK)

(72) Inventors: Janus Ellegaard Raasthøj, Nordborg (DK); Claus Vestergaard, Nordborg (DK); Klaus Hueg Wadsholt, Fredericia (DK); Blooshee Paulraj, Nordborg (DK)

(73) Assignee: Danfoss A/S, Nordborg (DK)

( * ) Notice: Subject to any disclaimer, the term of this patent is extended or adjusted under 35 U.S.C. 154(b) by 115 days.

(21) Appl. No.: 17/195,956

(22) Filed: Mar. 9, 2021

(65) Prior Publication Data
US 2021/0285561 A1  Sep. 16, 2021

(30) Foreign Application Priority Data

Mar. 11, 2020 (IN) ............................ 202011010371
May 8, 2020 (EP) ................................... 20173620

(51) Int. Cl.
*F16K 27/02* (2006.01)
*F16K 31/06* (2006.01)
*F16F 1/32* (2006.01)

(52) U.S. Cl.
CPC ............ *F16K 27/029* (2013.01); *F16F 1/324* (2013.01); *F16K 31/0655* (2013.01)

(58) Field of Classification Search
CPC ..... F16K 27/029; F16K 31/0655; F16F 1/324
See application file for complete search history.

(56) References Cited

U.S. PATENT DOCUMENTS 2,735,644 A * 2/1956 Bishofberger ...... F16K 31/0655
236/75
4,219,125 A * 8/1980 Wiltshire ............... B65D 90/08
220/648

(Continued)

FOREIGN PATENT DOCUMENTS

CN       100366964 C       2/2008
CN       101166926 B       8/2010
(Continued)

OTHER PUBLICATIONS

India First Examination Report dated Dec. 31, 2021 corresponding to Indian Application No. 202011010371.
(Continued)

*Primary Examiner* — Matthew W Jellett
(74) *Attorney, Agent, or Firm* — McCormick, Paulding & Huber PLLC

(57) ABSTRACT

An actuator of a refrigerant valve is described, the actuator comprising a housing (5) having a chamber (12) with an opening (15) in an end face (26) of an end section (17) of the housing (5), the end section (17) having an outer thread (18), a tightening collar (6) having a radially inwardly protruding flange (20) and an inner thread (19) matching the outer thread (18), and an anchor ring (7) positionable between the tightening collar (6) and the end face (16), wherein the anchor ring (7) is elastically deformable at least in a radial direction with respect to an axis of the outer thread (18) and in a mounted condition at least partially overlaps the end face (16) and the flange (20) of the tightening collar (6), wherein a sealing ring (8) at the end face (16) shows a free side to the axial direction and is com-pressed by an axial force produced by screwing the tightening collar (6) onto the outer thread (18).

18 Claims, 3 Drawing Sheets

(56) References Cited

U.S. PATENT DOCUMENTS

| | | | |
|---|---|---|---|
| 4,889,368 A | | 12/1989 | Laipply |
| 4,986,246 A | * | 1/1991 | Kessler de Vivie .......................... F16K 31/0651 251/129.21 |
| 5,799,989 A | | 9/1998 | Abino |
| 6,604,391 B2 | * | 8/2003 | Vellette ................... F16K 35/10 70/179 |
| 7,000,891 B2 | * | 2/2006 | Rocca ................... F16K 27/041 137/15.21 |
| 7,465,101 B2 | * | 12/2008 | Hoefs ................... F16C 25/083 384/517 |
| 7,886,760 B2 | * | 2/2011 | Groschel ................. F16K 31/06 335/297 |
| 2005/0139275 A1 | | 6/2005 | Rocca et al. |

FOREIGN PATENT DOCUMENTS

| | | |
|---|---|---|
| DE | 102012007739 A1 | 10/2013 |
| DE | 102017200550 B4 | 10/2018 |

OTHER PUBLICATIONS

Data Sheet, "Motor operated valves and Actuators", Danfoss, 2018.

* cited by examiner

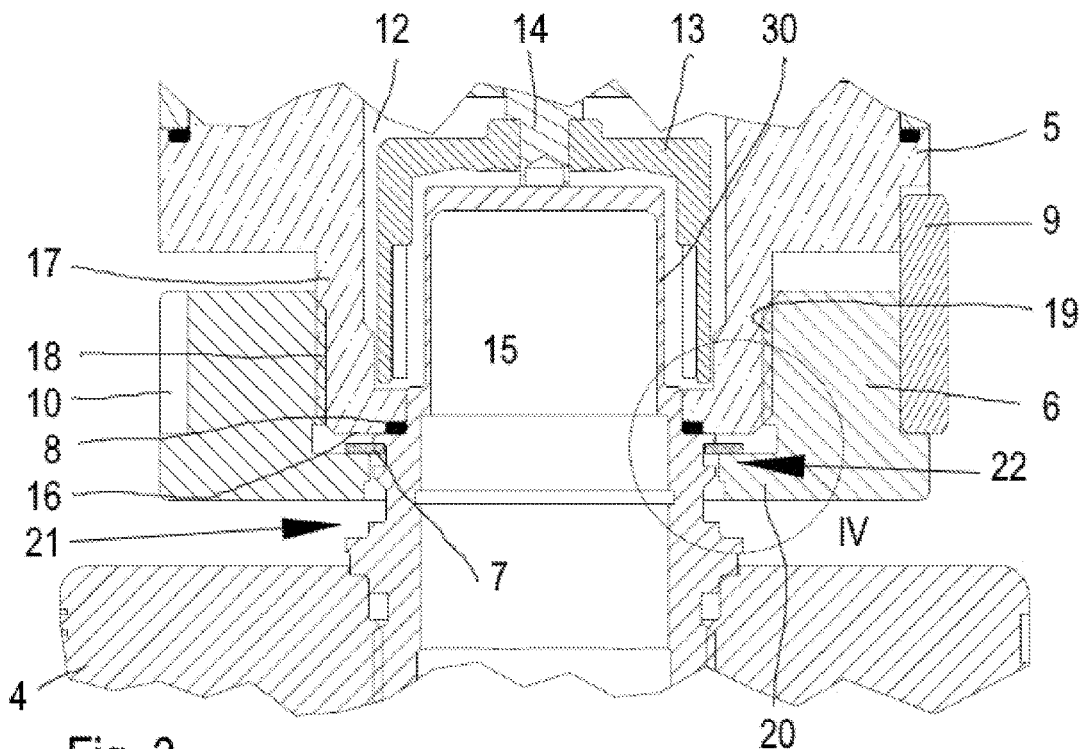
Fig. 3
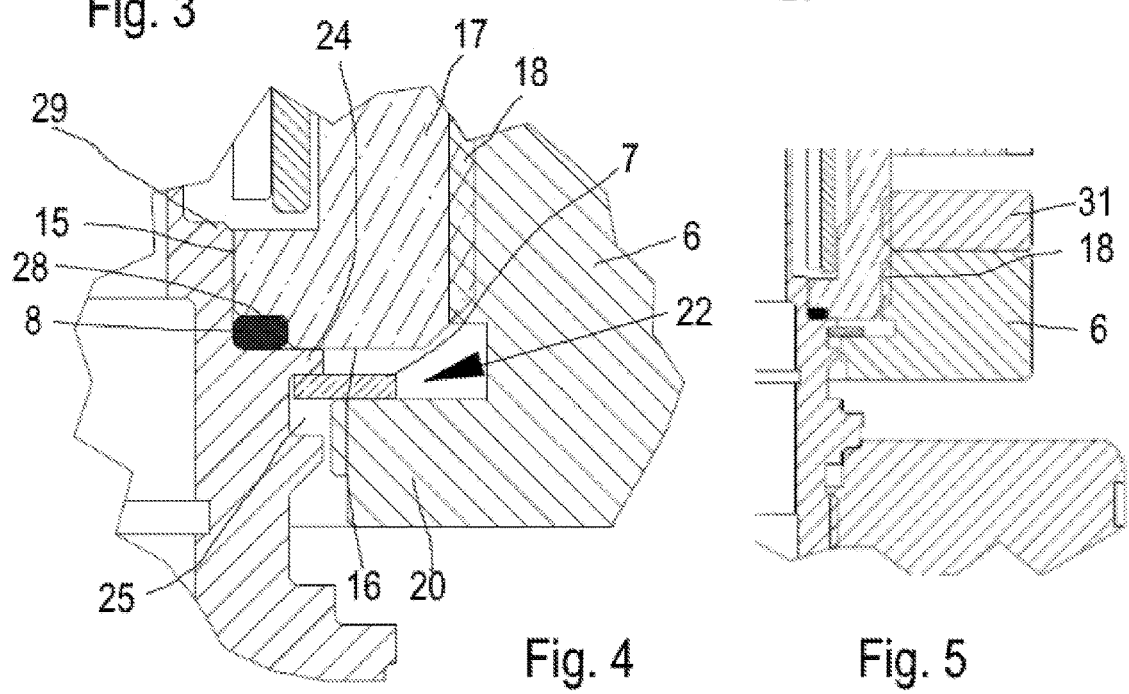
Fig. 4
Fig. 5
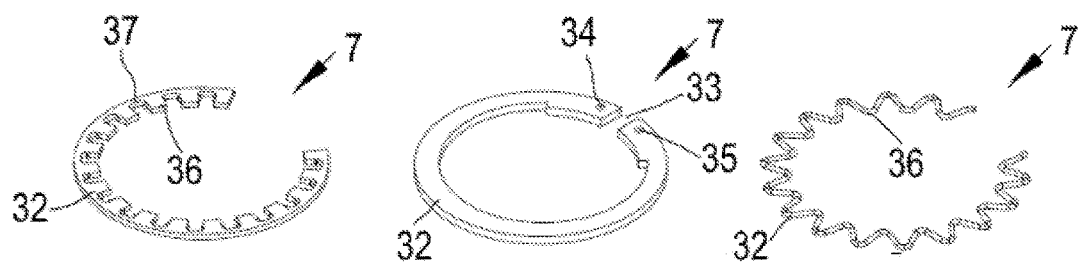
Fig. 7
Fig. 6
Fig. 8

ACTUATOR OF A REFRIGERANT VALVE, VALVE ARRANGEMENT COMPRISING A REFRIGERANT VALVE AND AN ACTUATOR AND METHOD FOR MOUNTING AN ACTUATOR OF A REFRIGERANT VALVE TO THE REFRIGERANT VALVE

CROSS-REFERENCE TO RELATED APPLICATIONS

This application claims foreign priority benefits under 35 U.S.C. § 119 to Indian Patent Application No. 202011010371 filed on Mar. 11, 2020, and European Patent Application No. 20173620.4 filed on May 8, 2020, each of which is hereby incorporated by reference in its entirety.

TECHNICAL FIELD

The present invention relates to an actuator of a refrigerant valve.

BACKGROUND

Furthermore, the invention relates to a valve arrangement comprising a refrigerant valve and such an actuator.

Finally, the invention relates to a method for mounting an actuator of a refrigerant valve to a refrigerant valve.

US 2005/0139275 A1 shows a screw-in valve having an actuator comprising a housing having a chamber with an opening in an end face of an end section of the housing, the end section having an outer thread. Furthermore, a tightening collar is provided having a radially inwardly protruding flange and an inner thread matching the outer thread, and an anchor ring positionable between the tightening collar and the end face. The anchor ring is elastically deformable at least in a radial direction with respect to an axis of the outer thread and in a mounted condition at least partially overlaps the end face and the flange of the tightening collar.

U.S. Pat. No. 4,889,368 A shows a combination quick-connect and thread-disconnect tube connector comprising a housing having a chamber with an opening in an end face of an end section of the housing, the end section having an outer thread. A tightening collar is provided having a radially inwardly protruding flange and an inner thread matching the outer thread. An anchor ring made of a plastic material is positioned between the tightening collar and the end face. The anchor ring is elastically deformable at least in a radial direction with respect to an axis of the outer thread and in a mounted condition at least partially overlaps the end face and the flange of the tightening collar.

U.S. Pat. No. 5,799,989 A shows a corrugated tubing fitting having a housing with a chamber. The housing comprises an outer thread on which a nut is screwed. The nut comprises a flange protruding radially inwardly. The nut is used to connect a corrugated tubing to the housing. To this end a split ring washer is arranged in a valley on the outer surface of the tubing and pressed against an end face of the housing by means of the nut.

A refrigerant valve is used to control the flow of a refrigerant which can have a rather low temperature. This leads to the problem that this low temperature is transferred to the actuator. Humidity entering the actuator can lead to ice formation within the actuator. This ice formation causes the risk that the actuator, more precisely the moving parts of the actuator, cannot be operated as desired.

The actuator has a chamber with an opening. A part of the refrigerant valve is inserted through the opening into the chamber. In order to prevent humidity from entering the chamber, the interface between the actuator and the refrigerant valve must be sealed.

SUMMARY

The object underlying the invention is to reliably seal a connection between an actuator of a refrigerant valve and the refrigerant valve.

This object is solved with an actuator of a refrigerant valve comprising a housing having a chamber with an opening in an end face of an end section of the housing, the end section having an outer thread, a tightening collar having a radially inwardly protruding flange and an inner thread matching the outer thread, and an anchor ring positionable between the tightening collar and the end face, wherein the anchor ring is elastically deformable at least in a radial direction with respect to an axis of the outer thread and in a mounted condition at least partially overlaps the end face and the flange of the tightening collar, wherein a sealing ring at the end face shows a free side to the axial direction and is compressed by an axial force produced by screwing the tightening collar onto the outer thread.

This actuator basically comprises three parts, namely the housing, the tightening collar and the anchor ring. The tightening collar can be screwed onto the outer thread of the end section of the housing to fix the housing to the refrigerant valve. In this way it is possible to produce an axial force which can be used to slightly compress a sealing ring, so that the tightness between the actuator and the refrigerant valve can be achieved. However, the tightening collar must have a counter part at the housing of the refrigerant valve against which it can rest to produce the axial forces which are necessary to compress the sealing ring. Such a counter part cannot be provided directly at the refrigerant valve, since it must be possible to guide the tightening collar over the respective parts of the refrigerant valve. Thus, the anchor ring is used. The anchor ring is elastically deformable and can be passed over a mounting section of the refrigerant valve and can be fixed at this mounting section after the tightening collar has been guided over the mounting section of the refrigerant valve. When the tightening collar is screwed onto the end section of the housing of the actuator, the tightening collar rests against the anchor ring which in turn is held at the refrigerant valve, so that a reliable connection between the actuator and the refrigerant valve can be achieved.

In an embodiment of the invention valve element driving means are arranged in, at a front face of and/or around the chamber. It is, for example, possible to use magnets which are rotatably driven and which are arranged in the chamber in a way that after insertion of the respective part of the refrigerant valve the magnets cooperate with corresponding counter magnets within the refrigerant valve. In this way the driving part of the refrigerant valve can be hermetically sealed.

In an embodiment of the invention a recess is arranged in the end face and the sealing ring is arranged in the recess, the recess having a cross section differing from the cross section of the sealing ring. In this way the sealing ring can be compressed in a simple way. However, due to the positioning in the recess the sealing ring is reliably kept in place even during mounting.

In an embodiment of the invention in at least one radial position an extension of the cross section of the sealing ring in axial direction is larger than a corresponding extension of the recess at the same position. At least in this radial position the sealing ring is compressed. The remainder of the sealing ring can be deformed.

In an embodiment of the invention the sealing ring comprises a circular cross section and the recess comprises a triangular cross section. Thus, a commercially available sealing ring, like an O-ring, can be used. Machining of a triangular recess is simple.

In an invention a recess comprises a volume which is smaller than the volume of the sealing ring. The sealing ring can be pre-mounted in the recess. Since the volume of the recess is smaller than the volume of the sealing ring, in other words, a section of the recess is smaller than a section of the sealing ring, the sealing ring is slightly compressed when the actuator is mounted on the refrigerant valve. Thus, the tightness of the connection is achieved.

In an embodiment of the invention the recess is open radially inwardly. This means that the sealing ring is not only compressed in an axial direction, but can also be pressed in a radial direction against a part of the refrigerant valve which passes through the sealing ring. Thus, a sealing in a radial direction and a sealing in the axial direction is achieved. The terms "axial" and "radial" relate to the axis of the outer thread on the end section of the housing of the actuator.

In an embodiment of the invention the anchor ring is in form of a spring ring. A spring ring can be, for example, be widened, e.g. by enlarging its inner diameter. When the diameter has been enlarged, it can be guided over a mounting section of the refrigerant valve. Once it has been mounted over this mounting section, it can be released so that it comes to rest behind a protrusion or another geometric form of the refrigerant valve which blocks a movement of the anchor ring in the reverse direction. Once the anchor ring has been mounted, it can serve as a counter part for the tightening collar.

In an embodiment of the invention the spring ring comprises a plurality of teeth pointing in a radial direction. The teeth have the technical effect that the anchor ring can have, in circumferential direction, sections with a reduced radial extension. This is advantageous for the ability of the anchor ring to be deformed. Thus, mounting is facilitated.

In an embodiment of the invention the tightening collar comprises an unscrew protection. The unscrew protection can have different forms. One possibility to have an unscrew protection is a lock nut or counter nut on the outer thread of the end section of the housing. Once the tightening collar has been screwed into the final position, the counter nut can be screwed against the tightening collar. Another possibility is to use a tightening collar having a number of axially recesses on the circumferential face. The housing of the actuator can have one or more corresponding recesses. Once the tightening collar has been screwed into its final position, a pin can be snapped into the recesses of the housing and of the tightening collar.

The object is solved with a valve arrangement comprising a refrigerant valve having a connection geometry to which an actuator as described above is mounted, wherein the connection geometry comprises a mounting section having a diameter larger than the diameter of the opening, smaller than the diameter of the end face, and smaller than an inner diameter of the tightening collar, wherein the mounting section comprises a radial protrusion behind which the anchor ring engages, wherein a sealing ring between the mounting section and the end face is compressed by an axial force produced by screwing the tightening collar onto the outer thread.

Thus, the anchor ring can be mounted behind the radial protrusion of the mounting section after the tightening collar has been placed over the mounting section. In this way the anchor ring forms a counter part or counter element against which the tightening collar can rest when it is screwed onto the outer thread of the end section of the housing.

In an embodiment of the invention the end face rests against the mounting section. In this way it is possible to reach a defined position of the end face in relation to the mounting section. In this way it is possible to achieve a well-defined compression of the sealing ring. The sealing ring cannot be over pressed.

In an embodiment of the invention the mounting section comprises an axial protrusion having an outer diameter matching an inner diameter of the opening. This protrusion can be guided through the opening into the chamber of the actuator. Since the protrusion matches the inner diameter of the opening, positioning of the actuator with respect to the valve is possible with a sufficient accuracy in radial direction. When the recess in the end face is open to the radially inner side, it can seal against the protrusion.

In an embodiment of the invention the refrigerant valve comprises a drive section protruding into the chamber. The drive section can continue the axial protrusion. The drive section of the refrigerant valve can house elements which are driven by the valve element driving means of the actuator.

In an embodiment of the invention the anchor ring has a radial extension which is smaller than a difference between a diameter of the inner thread and an outer diameter of the mounting section. This facilitates the mounting of the anchor ring. This will be described as follows: in the first step the tightening collar is placed over the mounting section. In a second step the anchor ring is mounted on the mounting section. When the radial difference between the mounting section and the inner thread on the tightening collar is larger than the radial extension of the anchor ring, the anchor ring can be passed through the gap between the tightening collar and the mounting section, so that the inner thread of the tightening collar can have a sufficient axial length.

The object is solved with a method for mounting an actuator of a refrigerant valve to the refrigerant valve, wherein a mounting section of the refrigerant valve is inserted into an opening of a chamber in an end section of the actuator, the end section being provided with an outer thread, and the actuator and the refrigerant valve are connected, wherein a tightening collar having a radially inwardly protruding flange and an inner diameter larger than an outer diameter of the mounting section is screwed onto the outer thread, wherein prior to screwing the tightening collar onto the outer thread the tightening collar is placed around the mounting section and an elastically deformable anchor ring overlap-ping in a mounted condition at least partly an end face of the end section and the flange of the tightening collar is arranged behind a radial protrusion of the mounting section, wherein a sealing ring is placed between the mounting section and the end face, wherein the sealing ring is axially compressed during mounting.

The radial protrusion of the mounting section can, for example, be formed by the side wall of a circumferential groove on the mounting section. The radial protrusion has an outer diameter which is smaller than the inner diameter of the tightening collar, so that it is possible to shift the tightening collar over the mounting section. However, the anchor ring extends the radial extension of the mounting section so that it can form a counter part or counter element of the refrigerant valve against which the tightening collar can rest when it is screwed onto the outer thread of the end section of the housing of the actuator. In this way it is possible to seal the interface between the actuator and the refrigerant valve by means of a sealing ring or other sealing means which is axially compressed. There are no radial forces acting on the faces of the mounting section and the end section which could deform these faces.

In an embodiment of the invention the anchor ring is radially expanded before placing it around the mounting section. This is a simple way to make the anchor ring temporarily, larger than the mounting section.

In an embodiment of the invention the sealing ring is placed between the mounting section and the end face, wherein the sealing ring preferably is com-pressed during mounting at most by 20%. In this way an over-compression of the sealing ring can be avoided.

BRIEF DESCRIPTION OF THE DRAWINGS

Embodiments of the invention will now be described with reference to the drawing, wherein:

FIG. 3 shows a sectional view of a connection between the valve and the actuator, FIG. 4 shows an enlarged detail IV of FIG. 3, FIG. 5 shows an alternative unscrew protection, FIG. 6 shows a first embodiment of an anchor ring, FIG. 7 shows a second embodiment of an anchor ring, FIG. 8 shows a third embodiment of an anchor ring.

DETAILED DESCRIPTION

Figures 1, 2:
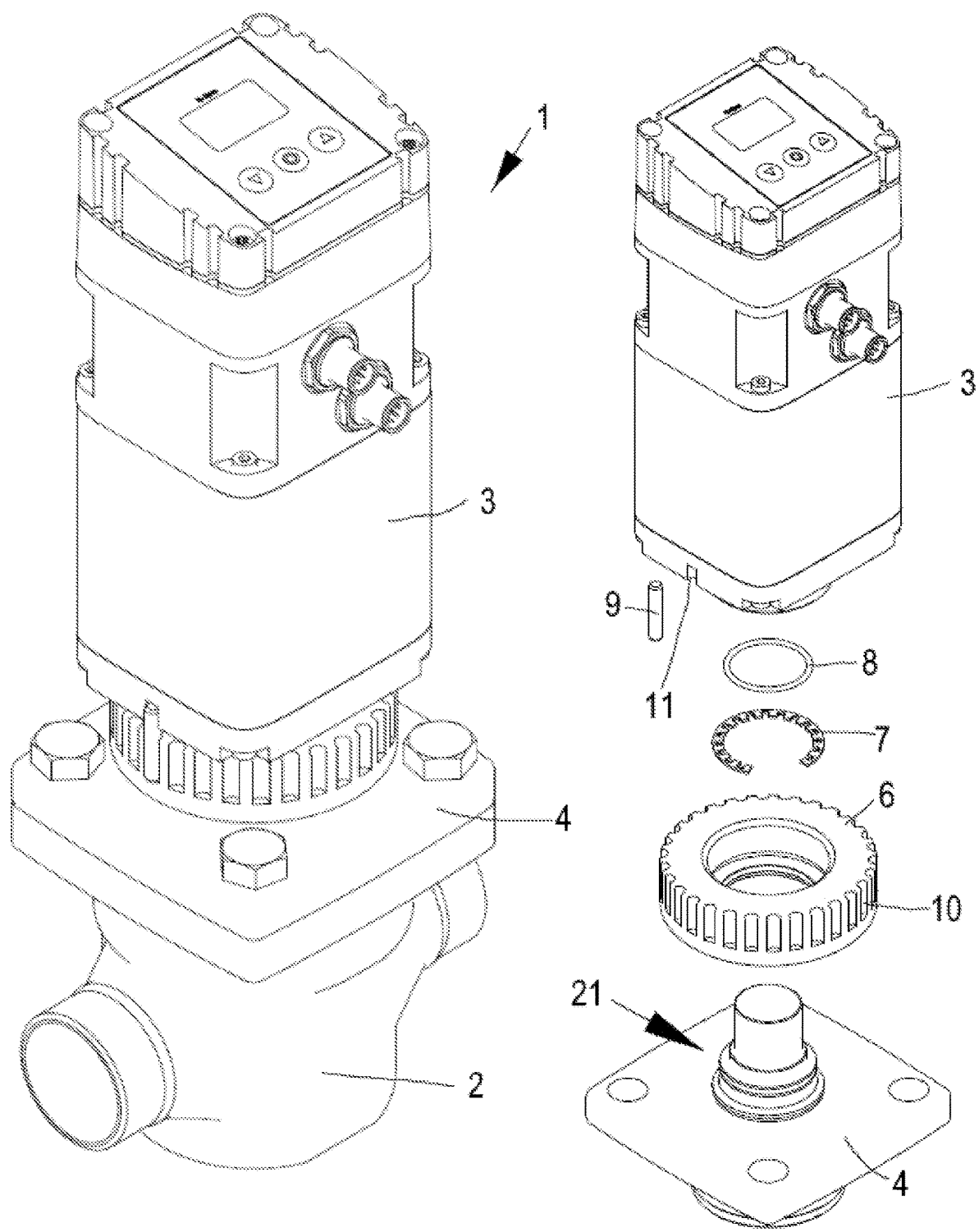
FIG. 1 shows a perspective view of a valve arrangement comprising a refrigerant valve and an actuator.
FIG. 2 shows a perspective exploded view of parts of the actuator including the top part of the valve.

FIG. 1 schematically shows in a perspective view a valve arrangement 1 comprising a refrigerant valve 2 and an actuator 3. The refrigerant valve 2 comprises an upper part 4 to which the actuator 3 is mounted. The refrigerant valve 2 can be hermetically sealed.

FIG. 2 shows parts of the actuator 3 which are used to mount and to fix the actuator 3 to the upper part 4 of the refrigerant valve 2. These parts are the housing 5 of the actuator 3, a tightening collar 6, an anchor ring 7 and a sealing ring 8.

Furthermore, a pin 9 is shown which can be used as an unscrew protection. To this end the tightening collar 6 comprises a number of recesses 10 which are distributed in circumferential direction over the outer circumference of the tightening collar 6. The housing 5 of the actuator 3 comprises a further recess 11. Once the tightening collar 6 is placed in its final position, the pin 11 can be pressed into the recess 11 in the housing 5 of the actuator and in a corresponding recess 10 on the tightening collar. The pin 11 is then held by a snap-on connection.

As can be seen in FIG. 3, the housing 5 of the actuator 3 comprises a chamber 12 in which valve element driving means 13 are arranged. The valve element driving means 13 are in form of magnets which are fixed to a shaft 14 which is rotatably driven by the actuator 3.

The chamber 12 comprises an opening 15 in an end face 16 of an end section 17 of the housing 5. Furthermore, the end section 17 has an outer thread 18.

The tightening collar 6 comprises an inner thread 19 and a flange 20 which protrudes radially inwardly. Thus, the inner diameter of the flange 20 is smaller than the diameter of the inner thread 19 and defines the smallest inner diameter of the tightening collar 6.

The upper part 4 comprises a connection geometry 21 having a mounting section 22. The mounting section 22 has a diameter which is larger than the diameter of the opening 15. Furthermore, the mounting section 22 has a diameter which is smaller than the diameter of the end face 16 and it is also smaller than an inner diameter of the tightening collar 6 which is defined by the flange 20.

In order to tighten the housing 5 of the actuator against the connection geometry 21 of the upper part 4 of the refrigerant valve 2, the anchor ring 7 is used. The anchor ring 7 is elastically deformable. Thus, it can be radially enlarged and in the enlarged condition guided over the mounting section 22 of the refrigerant valve 2. More precisely, it is sufficient to guide the anchor ring 7 behind a radial protrusion 24 of the mounting section 22 and to release the anchor ring 7, so that the anchor ring 7 can no longer be moved away from the upper part 4 of the refrigerant valve 2. The radial protrusion can be formed by a wall of a groove 25.

The anchor ring 7 now overlaps in radial direction the flange 20 of the tightening collar 6 and the end face 16 of the end section 17. When the tightening collar 6 is screwed onto the end section 17, the anchor ring 7 forms a counter part or counter element against which the tightening collar 6 abuts, so that it is possible to produce an axial force moving the end section 17 of the actuator 3 against the mounting section 22 of the refrigerant valve 2.

The sealing ring 8 is arranged in a recess 28 in the end face 16 of the end section 17. The recess 28 is open radially inwardly. Furthermore, the recess 28 has a section which is smaller than the section of the sealing ring 8. The relation between the sections can be such that the sealing ring 8 is compressed by at most 20% when the end face 16 comes into contact with the mounting section 22. It is not absolutely necessary that the sealing ring 8 fully fills the recess. It is sufficient, when the sealing ring 8 is compressed during mounting.

As can be seen in FIG. 3, the mounting section 22 comprises a protrusion 29 having an outer diameter matching an inner diameter of the opening 15. Thus, when the actuator 3 is mounted on the refrigerant valve 2, it is radially precisely positioned.

The refrigerant valve 2 comprises a drive section 30 protruding into the chamber 12. The driving section 30 is arranged in an operating range of the valve driving means 13. In a way not shown, driven elements of the refrigerant valve 2 are arranged in the drive section 30. The driven elements are driven by the drive elements 13, in particular by a magnetic driving force.

FIG. 5 shows another possibility of an unscrew protection. A locking nut 31 is screwed onto the outer thread 18. Once the tightening collar 6 has been screwed into the final position, the locking nut 31 is screwed in the opposite direction to clamp the locking collar 6 on the outer thread 18.

FIG. 6 shows a first embodiment of the anchor ring 7 in form of a spring ring 32. The spring ring 32 has a gap 33 in circumferential direction. Furthermore, two small holes 34, 35 are provided in sections near the gap 33. A mounting tool can engage the holes 34, 35 to spread the spring ring 32 and to enlarge its inner diameter, so that it can be moved over the protrusion 24 of the mounting section 22. When the spring ring 32 is released, it is positioned in the groove 25 and forms the anchor ring 7.

FIG. 7 shows a second embodiment of the anchor ring 7. This anchor ring 7 comprises a number of teeth 36 which protrude radially inwardly. These teeth 36 enter the groove 25 and are positioned behind the radial protrusion 24. The teeth 36 are connected by small bridges 37 running in circumferential direction. Furthermore, this anchor ring 7 comprises likewise a gap 33 so that it can be enlarged.

FIG. 8 shows a third embodiment of the anchor ring 7 having likewise teeth 36 protruding radially inwardly. However, the teeth are formed by a zick-zack form of the anchor ring 7.

In any way, the radial extension of the anchor ring 7 is smaller than a distance between the radial protrusion 24 and the inner thread 19 of the tightening collar 6. Thus, the anchor ring 7 can be mounted even when the tightening collar 6 overlaps the radial protrusion 24 in axial direction.

Figure 9A:
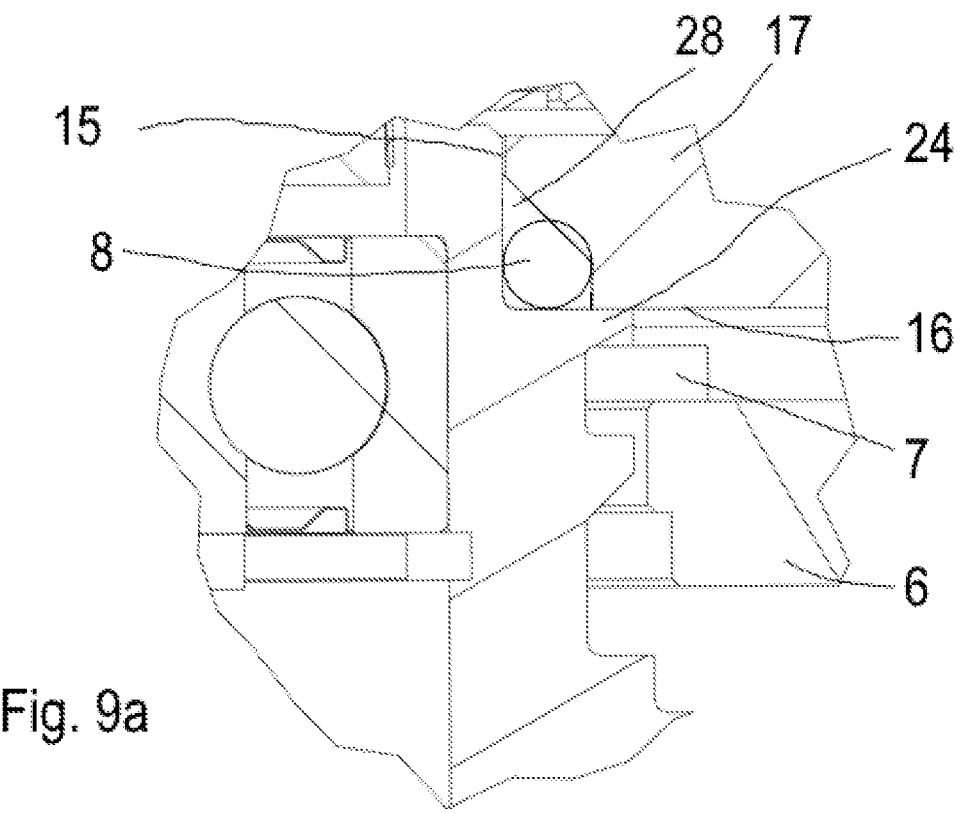
FIG. 9a shows the sealing ring 8 in undeformed condition.
Figure 9B:
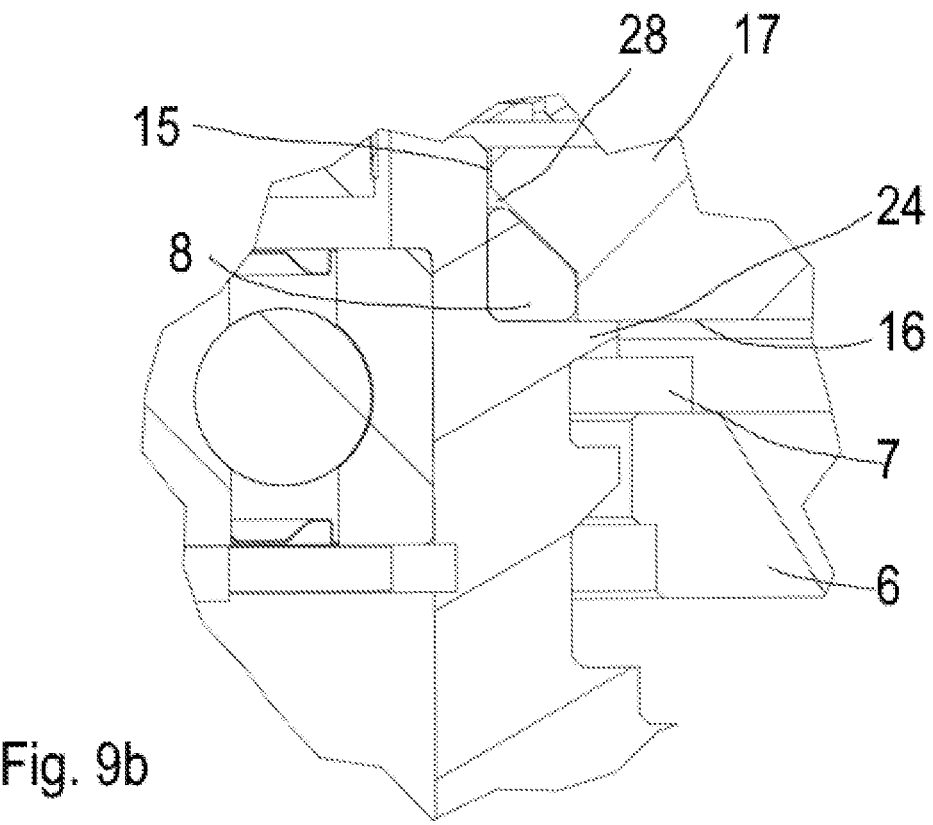
FIG. 9b shows the sealing ring 8 in deformed condition.

FIG. 9 shows an second embodiment of the connection of the valve 2 and the actuator 3. Same elements are denoted with the same reference numerals.

FIG. 9a shows the sealing ring 8 in undeformed condition. The sealing ring 8 can be in form of an O-ring having a circular cross section. Other cross sections are possible. The recess 28 has a triangular cross section, i. e. the height or extension in axial direction decreases from a radially inner part of the recess to a radially outer part of the recess 28. The cross sections of the sealing ring 8 and of the recess 28 do not coincide. In some radial sections of the recess 28 the axial extension of the sealing ring 8 is larger than the axial extension of the recess 28. The directional terms "axial" and "radial" refer to an axis of the outer thread 18. In other radial sections of the recess 28 the axial extension of the sealing ring 8 is smaller than that of the recess 28, so that in an undeformed state of the sealing ring there are empty areas of the recess 28.

When the tightening collar 6 is screwed onto the outer thread 18, the sealing ring 8 is compressed and deformed into the previously empty spaces, so that an overpressure of the sealing ring can be avoided, however, a sufficient and reliably tightness can be achieved.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. An actuator of a refrigerant valve, the actuator comprising a housing having a chamber with an opening in an end face of an end section of the housing, the end section having an outer thread, a tightening collar having a radially inwardly protruding flange and an inner thread matching the outer thread, and an anchor ring positionable between the tightening collar and the end face, wherein the anchor ring is elastically deformable at least in a radial direction with respect to an axis of the outer thread and in a mounted condition at least partially overlaps the end face and the flange of the tightening collar, wherein a sealing ring at the end face shows a free side to the axial direction and is compressed by an axial force produced by screwing the tightening collar onto the outer thread, and wherein the axial force is transmitted through the anchor ring to compress the sealing ring.

2. The actuator according to claim 1, wherein valve element driving means are arranged in, at a front face of and/or around the chamber.

3. The actuator according to claim 1, wherein a recess is arranged in the end face and the sealing ring is arranged in the recess, the recess having a cross section differing from the cross section of the sealing ring.

4. The actuator according to claim 3, wherein in at least one radial position an extension of the cross section of the sealing ring in axial direction is larger than a corresponding extension of the recess at the same position.

5. The actuator according to claim 4, wherein the sealing ring comprises a circular cross section and the recess comprises a triangular cross section.

6. The actuator according to claim 1, wherein the recess comprises a volume which is smaller than the volume of the sealing ring.

7. The actuator according to claim 3, wherein the recess is open radially inwardly.

8. The actuator according to claim 1, wherein the anchor ring is in form of a spring ring.

9. The actuator according to claim 8, wherein the spring ring comprises a plurality of teeth pointing in a radial direction.

10. The actuator according to claim 1, wherein the tightening collar comprises an unscrew protection.

11. A valve arrangement comprising the refrigerant valve having a connection geometry to which an actuator according to claim 1 is mounted, wherein the connection geometry comprises a mounting section having a diameter larger than the diameter of the opening, smaller than the diameter of the end face, and smaller than an inner diameter of the tightening collar, wherein the mounting section comprises a radial protrusion behind which the anchor ring engages, wherein a sealing ring between the mounting section and the end face is compressed by an axial force produced by screwing the tightening collar onto the outer thread.

12. The valve arrangement according to claim 11, wherein the end face rests against the mounting section.

13. The valve arrangement according to claim 10, wherein the mounting section comprises an axial protrusion having an outer diameter matching an inner diameter of the opening.

14. The valve arrangement according to claim 11, wherein the refrigerant valve comprises a drive section protruding into the chamber.

15. The valve arrangement according to claim 11, wherein the anchor ring has a radial extension which is smaller than a difference between a diameter of the inner thread and an outer diameter of the mounting section.

16. A method for mounting an actuator of a refrigerant valve to the refrigerant valve, wherein a mounting section of the refrigerant valve is inserted into an opening of a chamber in an end section of the actuator, the end section being provided with an outer thread, and the actuator and the refrigerant valve are connected, wherein a tightening collar having a radially inwardly protruding flange and an inner diameter larger than an outer diameter of the mounting section is screwed onto the outer thread, wherein prior to screwing the tightening collar onto the outer thread the tightening collar is placed around the mounting section and an elastically deformable anchor ring overlapping in a mounted condition at least partly an end face of the end section and the flange of the tightening collar is arranged behind a radial protrusion of the mounting section, wherein a sealing ring is placed between the mounting section and the end face, wherein the sealing ring is axially compressed during mounting by an axial force, and wherein the axial force is transmitted through the anchor ring to compress the sealing ring.

17. The method according to claim 16, wherein the anchor ring is radially expanded before placing it around the mounting section.

18. The method according to claim 16, wherein the sealing ring is axially compressed during mounting at most by 20%.

* * * * *